United States Patent [19]

Worthing

[11] 4,010,519
[45] Mar. 8, 1977

[54] FASTENER STRUCTURES UTILIZING A THERMOPLASTIC ADHESIVE

[75] Inventor: Albert L. Worthing, Tustin, Calif.

[73] Assignee: Shur-Lok Corporation, Santa Ana, Calif.

[22] Filed: Nov. 24, 1975

[21] Appl. No.: 634,665

[52] U.S. Cl. .................................. 24/141; 85/37
[51] Int. Cl.² ..................... A43C 5/00; F16B 19/04
[58] Field of Search .............. 24/141, 142, 143 R, 24/DIG. 11, 201 R, 90 HA; 85/37; 156/331, 293; 260/857 TW

[56] References Cited

UNITED STATES PATENTS

| 76,695 | 4/1868 | Barclay | 24/141 X |
|---|---|---|---|
| 2,326,455 | 8/1943 | Gray | 85/37 |
| 2,583,719 | 1/1952 | White | 24/141 |
| 2,748,047 | 5/1956 | Kuss | 24/142 X |
| 2,801,948 | 8/1957 | Walker | 24/141 X |
| 3,399,435 | 9/1968 | Ackerman | 24/141 |
| 3,639,137 | 2/1972 | Marinelli | 85/37 X |
| 3,933,762 | 1/1976 | Naito et al. | 156/331 X |
| 3,935,619 | 2/1976 | Gaastra | 24/141 |
| 3,939,029 | 2/1976 | Gilliam et al. | 156/331 |

FOREIGN PATENTS OR APPLICATIONS

| 188,269 | 1/1957 | Austria | 24/141 |
|---|---|---|---|
| 612,099 | 1/1961 | Canada | 24/141 |

Primary Examiner—Paul R. Gilliam
Assistant Examiner—V. N. Sakran
Attorney, Agent, or Firm—Edward D. O'Brian

[57] ABSTRACT

A fastener structure which is especially desirable for use with laminated members such as graphite fiber members in which the fibers are secured together with an epoxy resin can be constructed utilizing a layer of a thermoplastic adhesive on at least one heat conductive functional part of the fastener. The fastener is preferably constructed so as to include a plate capable of being located against a surface of the member, a shank extending through a hole in the member and a holding part or element for securing the shank so that the plate is held against the surface of the member. The precise fastener used may be formed as a grommet, a rivet, a nut element or the like. Such a fastener can be constructed so as to provide corner reinforcement for the laminated member.

4 Claims, 7 Drawing Figures

U.S. Patent     Mar. 8, 1977     4,010,519
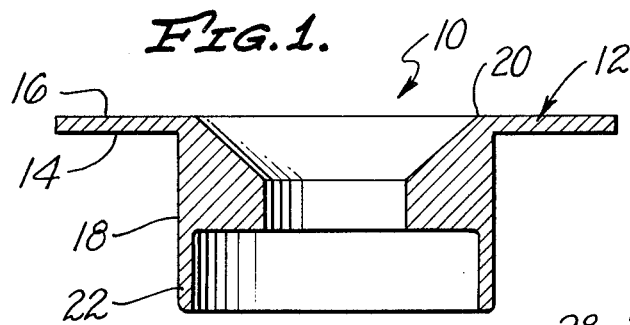
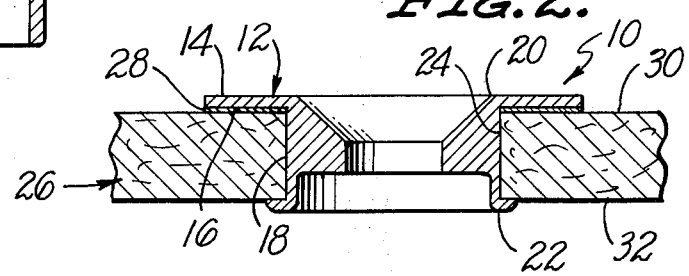
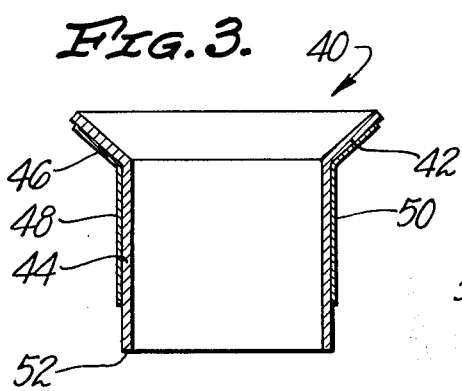
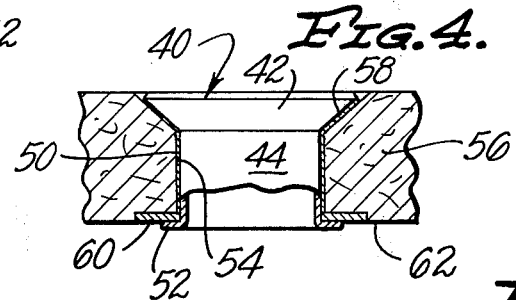
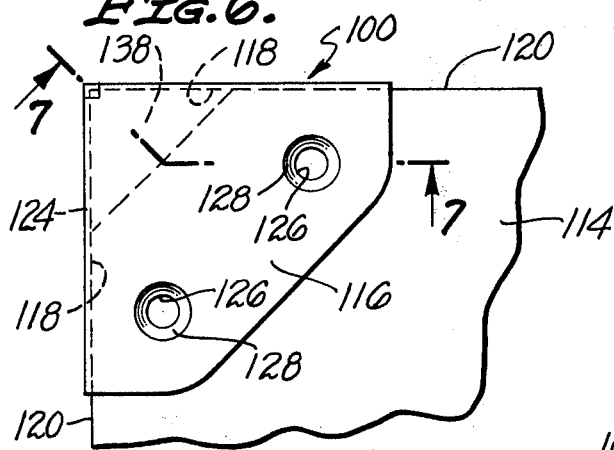
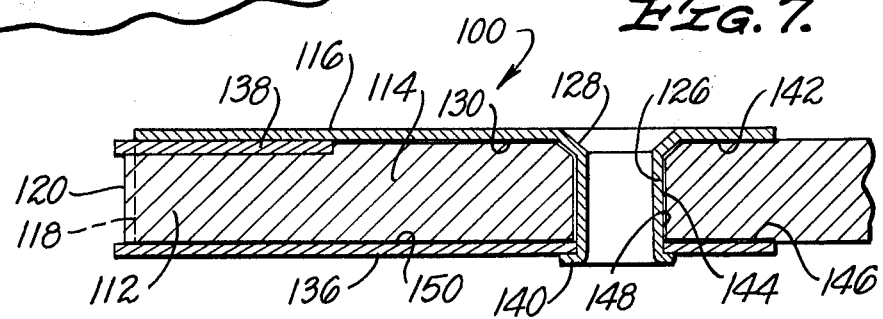

FASTENER STRUCTURES UTILIZING A THERMOPLASTIC ADHESIVE

BACKGROUND OF THE INVENTION

The invention set forth in this specification pertains to new and improved fastener structures. Specifically it pertains to fastener structures utilizing an adhesive which are especially adapted for use with various types of laminated members but which are also capable of other utilizations.

The word "fastener" is a rather broad, generic term utilized so as to designate any device intended to be utilized in securing any article in place or to another article. As this word is used in this specification it is intended to designate various common fasteners or fastener structures such as grommets, rivets, nut elements, reinforcements and the like which are utilized in connection with a member such as a panel, a fabric, or the like for any of a wide variety of different, diverse purposes. Many different fastener structures for such purposes are, of course, known and utilized. Indeed various different types of such fasteners have probably been utilized since the advent of civilization. Many different specific types of fastener structures have been developed for different specific utilizations.

At the present time so-called "laminated" members or structures consisting of a plurality of fibers disposed in one or more layers into a single member are being increasingly utilized in various "critical" type applications. Normally the fibers in such structures are bonded together or held together by the use of an appropriate polymer or polymer system. As an example of this at the present time members are being increasingly utilized in aerospace applications which include a plurality of graphite fibers oriented in a desired manner and secured together by an epoxy polymer composition. Normally the surfaces of such members are not completely smooth because of the construction of such members.

Several difficulties have been encountered in connection with the utilization of known fasteners in connection with such laminated members. At times a problem has been encountered in adequately securing such fasteners to such members so that there is no reasonable chance of relative motion between these fasteners and these members. Efforts have been made to remedy this problem through the utilization of a thermosetting material secured to at least one surface of a fastener designed to be in contact with a member. Expedients of this type are considered to be and to have been undesirable because of economic considerations.

In effect, time is money in manufacturing operations. Generally speaking it is extremely desirable to be able to install a fastener in such a manner that the fastener is incapable of relative movement with respect to the member upon which it is installed within a minimum time. It is considered that prior fasteners or fastener structures related to the fastener structures of the present invention have not been desirable because of either problems of adequate engagement with a member used with such a structure and/or because of the time required to satisfactorily install such structures in operative positions.

SUMMARY OF THE INVENTION

A basic objective of the present invention is to provide new and improved fastener structures. More specifically the invention is intended to provide fastener structures which can be easily and conveniently located in an operative position quite rapidly and which, when installed, are held in secure engagement with a member upon which they are used. Further objectives of the present invention are to provide fasteners as indicated in the preceding sentence which may be easily and conveniently manufactured at a comparatively minimal cost.

In accordance with this invention these and various related objectives of the invention are achieved by providing a fastener structure for use with a member having opposed surfaces and a hole extending between the surfaces which comprises: a plate having an upper surface and a lower surface, said plate being adapted to be located with respect to the member so that the lower surface is adjacent to the member, shank means for use in securing the plate to the member, the shank means extending from said plate and being shaped so as to fit through the hole; said plate or said shank means or both said plate and said shank means being formed of a metal capable of conducting heat; and a continuous layer of a thermoplastic adhesive on said metal, said layer being located so as to be adapted to be in engagement with said member.

BRIEF DESCRIPTION OF THE DRAWING

The invention is best more fully explained with reference to the accompanying drawing in which:

FIG. 1 is a cross-sectional view through the center of a fastener structure in accordance with this invention;

FIG. 2 is a view similar to FIG. 1 showing a fastener structure installed upon a laminated member or panel;

FIG. 3 is a view similar to FIG. 1 of a modified fastener structure of the present invention;

FIG. 4 is a view similar to FIG. 2 indicating one manner of use of this modified fastener structure shown in FIG. 3;

FIG. 5 is a view similar to FIG. 2 indicating another manner of use of this modified fastener structure shown in FIG. 3;

FIG. 6 is a top plan view of a further modified fastener structure of the invention installed upon a laminated member or panel at the corner of such a member or panel; and FIG. 7 is a partial cross-sectional view at an enlarged scale taken at line 7—7 of FIG. 6.

The various fastener structures illustrated in the drawing are various different preferred embodiments of structures utilizing the principles or features of this invention. These principles or features are verbally defined in the appended claims forming a part of this specification. It is considered that it will be obvious that they may be employed in many somewhat differently appearing and differently constructed fastener structures, such as various different grommets, rivets, nut elements, stiffener structures, and the like, through the use or exercise of routine engineering skill or ability.

DETAILED DESCRIPTION

In FIGS. 1 and 2 of the drawing there is shown a fastener structure 10 in accordance with the present invention which is shaped so as to serve as a spacer or grommet. This fastener 10 includes a washer-like flat metal plate 12 having an upper surface 14 and a lower surface 16. A cylindrical shank 18 is connected to the inner edge 20 of the plate 12 so as to extend from the lower surface 16. The interior of this shank 18 may be shaped in any desired manner. Thus, for example, it can be shaped so as to contain threads (not shown) so that a bolt may be threaded into it. Preferably the shank 18 is integral with the plate 12 although if desired this shank 18 may be formed as a separate member. This shank 18 terminates in a cylindrical flange 22 which is adapted to be employed as a holding means.

When the fastener 10 is to be utilized the flange 22 and the shank 18 are inserted through a closely fitting hole 24 in a member 26, such as, for example, a laminated member formed so as to contain graphite fibers secured together by an epoxy adhesive. The fastener 10 is preferably inserted to a sufficient extent so that a continuous, void-free adhesive ring 28 having a uniform thickness of a thermoplastic adhesive such as a nylon modified polyamide adhesive located on the lower surface 16 is in direct intimate contact with an upper surface 30 on the member 26. At this point the flange 22 will be bent over in accordance with conventional practice so as to firmly and resiliently engage the lower surface 32 of the member 26. One other step is required for the installation of this fastener 10. This step involves the application of heat to the adhesive ring 28 in order to cause the thermoplastic material in this ring to flow so as to form a direct, intimate bond with surface irregularities on the upper surface 30 and with the lower surface 16.

In FIGS. 3, 4 and 5 of the drawing there is shown a further fastener structure 40 of the present invention which is shaped more or less as a common beveled rivet. This fastener 40 has an upper "plate" 42 in the shape of a frustrum of a right circular cone. This plate 42 leads to a cylindrical tubular shank 44 which is preferably integral with the plate 42. Both the lower or under surface 46 of the plate 42 and the external surface 48 of the shank 44 are coated with a uniform, void-free layer 50 having a uniform thickness of a thermoplastic adhesive such as the adhesive indicated in the preceding discussion. If desired in a particular application this layer may be spaced from the end 52 of the shank 44 as shown in FIG. 3.

In one manner of use of the fastener 40 it is inserted through a hole 54 in a member 56 corresponding to the previously described member 26 so that the plate 42 fits against a beveled shoulder 58 in this hole 54. A common washer 60 may be then located around the end 52 against the lower surface 62 of the member 56. At this point the end 52 may be bent over so as to secure the plate 42 against the shoulder 58. This end 52 may of course be bent so as to serve as a holding means in a conventional manner. The installation of the fastener 40 is then completed through the application of heat to the layer 50 so as to cause the thermoplastic material in the layer 50 to form a direct intimate bond as previously indicated.

In FIG. 5 of the drawing there is shown another manner in which the fastener 40 may be used in connection with the same member 56. In this application the washer 50 is omitted and the fastener 40 is cut off to a length corresponding to the thickness of the member 56. In this manner of use of the fastener 40 it is merely inserted in place and heat is supplied to the layer 50 so as to form a bond as described.

In FIGS. 6 and 7 there is shown a fastener structure 100 in accordance with this invention which is designed so as to reinforce a corner 112 of a member 114 corresponding to the member 126 previously indicated. This fastener 100 includes a plate 116 having edges 118 which are located adjacent to the edges 120 of the corner 112. Edge flanges 124 are located along the edges 120 so as to overlie the edges 120. This plate 116 is provided with several integrally formed, tubular, cylindrical shanks 126 connected to the plate 116 by tapered shoulders 128.

These shanks 126 extend from the under surface 130 of the plate 116 in a pattern enabling them to fit closely within holes 132 in a flat back-up member or plate 136 which corresponds closely in shape and configuration to the plate 116. If desired a small triangular reinforcing spacer 138 may be located between the plates 116 and 136 at the corner 112 so as to effectively prevent any bending at this corner 112. The plates 116 and 136 are secured together by bending over the ends 140 of the shanks 120 or they may then be bonded in place by the application of heat prior to the ends 140 being bent.

After the parts of the structure 100 are in place and preferably before these ends 140 are bent, heat is applied to continuous, void-free layers 142, 144 and 146 of uniform thickness of an adhesive as described located upon the under surface 130 of the plate 116, the exterior surfaces 148 of the shanks 126 and the under surface 150 of the plate 136. Although the benefits of the invention can be achieved through the use of only one of these layers 142, 144 and 146, preferably all three are employed in order to obtain an effective holding action. The application of heat is for the purpose of bonding the adhesive as described.

It might be assumed from the preceeding that the invention is comparatively simple. However, there are certain factors common to all of these structures 10, 40 and 100 which are not indicated in the preceding and which are quite important in obtaining satisfactory fastening elements. In order for any of the fasteners described in the preceding to perform satisfactorily it is necessary for the fasteners to be constructed so that heat can be applied to the adhesive used in such fasteners as rapidly as reasonably possible in a sufficient amount so as to obtain a rapid flow and bonding of adhesive without the adhesive being detrimentally effected by "excess" heat.

In order to achieve this result it is considered necessary that each part of the fasteners described upon which an adhesive is located be formed of a metal which is capable of rapidly and efficiently transferring heat within the "usable temperature range" of the adhesive employed. This expression usable temperature range as employed herein is intended to designate the range of temperatures at which the adhesive will flow and form an effective bond. In order to achieve heat transfer as desired it is considered that the metal used in the fastener should have a thermo-conductivity "$k$" as expressed in the well known equation indicating the basic FOURIER conduction law of at least 10 and preferably well in excess of 10 throughout such a temperature range. Many metals such as aluminum, normal grades of steel, brass, bronze and the like, have suitable conductivity for use with the invention.

What is referred to in the preceding as a usable temperature range will of course vary somewhat depending upon the specific thermoplastic adhesive employed. Generally speaking, however, any adhesive used with the present invention should be inert in the normal range of ambient temperatures and at temperatures normally encountered during shipment and the like. In order to prevent premature activation it is considered that an adhesive used with the invention should not "kick over" or should be stable at a temperature up to about 50° C. Normally an adhesive as used with the invention will be of such a character as not to significantly breakdown from the application of heat so long as it is not heated past about 200° C., although in some cases adhesives which will tend to deteriorate or breakdown at lower temperatures can be employed with the invention.

In the preferred manner of use of the invention heat is applied to a metal part as indicated to a sufficient extent to heat the adhesive to within a usable temperature range as indicated without overheating the adhesive through the application to such metal part of a heated tool such as a soldering iron type tool. Preferably such a tool is thermostatically regulated so as to avoid the application of an amount of heat which will detrimentally effect the adhesive polymer or polymer system used. Suitable heating can also be accomplished by heating a metal part as indicated formed out of a ferrous material through the use of an induction heating coil. During such heat, the adhesive will, of course, flow to form an intimate bond with adjacent surfaces. Preferably a holding means or structure as described will exert pressure operating on the adhesive so as to promote such flow.

The adhesive used should preferably be in the form of a continuous layer so as to avoid discontinuities which might detrimentally effect strength characteristics. There should be sufficient adhesive present in any layer to form a good, effective bond without excess adhesive tending to detrimentally effect strength characteristics and/or to preclude reasonably uniform heating of all of the adhesive present. At present preferred results have been achieved with adhesive layers from about 0.005 to about 0.008 inch thick (0.0127 to 0.0203 cm thick) in fasteners where the adhesive is to be placed in tension in use and with the adhesive from about 0.008 to about 0.012 inch thick (0.0203 to 0.0304 cm thick) in fasteners as herein described where the adhesive is intended to be used in shear. Slightly thinner or thicker layers of adhesive can of course be employed and the thickness of any layer to achieve optimum results will be dependent upon the adhesive used.

It is presently considered preferable to utilize a nylon modified polyamide adhesive because of the strength characteristics of such an adhesive. Very similar results can be achieved by utilizing nylon modified epoxy adhesives. Those familiar with the art of adhesives will recognize that a large number of other adhesives can be utilized with the invention.

From a commercial standpoint it is considered critical for the entire fastener structure—including the adhesive layer—to be formed so that on a commercial basic heat can be applied to activate the thermoplastic adhesive in an extremely short period of less than about 10 seconds and preferably less than about 6 seconds. When a thermoplastic adhesive is used as described in a thickness as indicated adequate heat will permeate to all parts of the adhesive as heat is applied so as to cause the adhesive to flow to conform quite closely to all surfaces in contact with it as a firm effective bond is achieved.

I claim:

1. A fastener structure for use with a member having opposed surfaces and a hole extending between said surfaces which comprises:
    a metal plate capable of conducting heat having an upper surface and a lower surface, said plate being adapted to be located with respect to said member so that said lower surface is adjacent to said member,
    a metal shank means capable of conducting heat for use in securing said plate to said member, said shank means extending from said plate and being shaped so as to fit through said hole,
    a continuous layer of a thermoplastic adhesive located on said metal parts, said layer being located so as to be adapted to be in engagement with said member as said fastener is located with respect to said member,
    said metal in said plate and said shank means has a thermoconductivity $k$ of at least 10 within the range of temperatures within which said adhesive is capable of being bonded by the application of heat,
    said range of temperatures is from about 50° to about 200° C.,
    said layers of adhesive are from about 0.005 to about 0.012 inch thick, and
    said adhesive is a nylon modified polyamide adhesive.

2. A fastener structure for use with a member having opposed surfaces and a plurality of holes extending between said surfaces which comprises:
    a flat metal plate capable of conducting heat having an upper surface, a lower surface, and edges which are adapted to overlay the edges of a corner of said member and including edge flanges which are adapted to overlay the edges of said corner, said plate being adapted to be located with respect to said member,
    shank means comprising a plurality of tubular, cylindrical metal shanks capable of conducting heat attached to said plate so as to extend therefrom for use in securing said plate to said member, said shank means extending from said plate and being shaped so as to fit through said hole, each of said shanks being adapted to fit within one of said holes,
    said shank means or both said plate and said shank means being formed of a metal capable of conducting heat,
    a continuous layer of a thermoplastic adhesive located on at least one of said metal parts, said layer being located so as to be adapted to be in engagement with said member as said fastener is located with respect to said member,
    a flat backup member corresponding in shape and configuration to said plate adapted to be located adjacent to the surface of said member remote from said plate, said backup member having holes formed therein, said shank fitting through said holes in said backup member,
    means on said shanks for engaging said backup member so as to hold said backup member relative to said plate.

3. A fastener structure as claimed in claim 2 wherein:
    said plate, said shanks and said backup member are all formed of a metal all having a thermoconductivity $k$ of at least 10 within a temperature range of from about 50° to about 200° C.,
    layers of thermoplastic adhesive are located on said plate, said shanks and said backup member so as to be in contact with said member when said fastener structure is installed, and
    said adhesive is capable of being cured so as to form an adhesive bond when heated to within said temperature range.

4. A fastener structure as claimed in claim 3 wherein:
    said adhesive is a nylon modified polyamide adhesive and said layers are from about 0.005 to about 0.012 inch thick.

* * * * *

UNITED STATES PATENT AND TRADEMARK OFFICE
CERTIFICATE OF CORRECTION

PATENT NO. : 4,010,519
DATED : March 8, 1977
INVENTOR(S) : Albert L. Worthing

It is certified that error appears in the above—identified patent and that said Letters Patent is hereby corrected as shown below:

Figure 1, should appear as shown below:

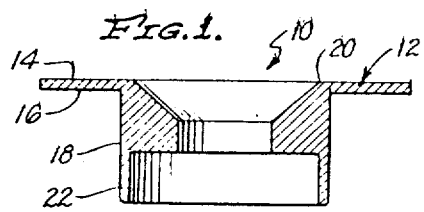

Figure 7, should appear as shown below:

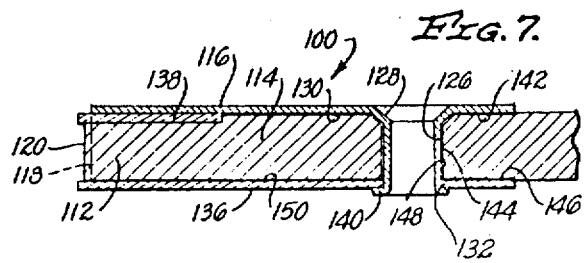

UNITED STATES PATENT OFFICE
CERTIFICATE OF CORRECTION

Page 2 of 2

PATENT NO. : 4,010,519
DATED : MARCH 8, 1977
INVENTOR(S) : ALBERT L. WORTHING

It is certified that error appears in the above-identified patent and that said Letters Patent are hereby corrected as shown below:

Column 3, line 59, "washer 50" should read --washer 60--.

Column 3, line 67, "member 126" should read --member 26--.

Column 4, line 16, "shanks 120" should read --shanks 126--.

Column 5, line 54, change "basic" to --basis--.

Signed and Sealed this

Eleventh Day of May 1982

[SEAL]

Attest:

*Attesting Officer*

GERALD J. MOSSINGHOFF

*Commissioner of Patents and Trademarks*